United States Patent [19]

Parker

[11] Patent Number: 5,366,089
[45] Date of Patent: Nov. 22, 1994

[54] SEPARABLE FOOD AND BEVERAGE CONTAINER COMBINATION

[76] Inventor: Eddy D. Parker, Rte. 2, Box 4B, Comanche, Tex. 76442

[21] Appl. No.: 228,878

[22] Filed: Apr. 18, 1994

[51] Int. Cl.$^5$ ............................................. A45C 11/20
[52] U.S. Cl. .................................. 206/546; 206/549; 220/529
[58] Field of Search ............... 206/541, 542, 545, 546, 206/549, 550, 544

[56] References Cited

U.S. PATENT DOCUMENTS

| | | | |
|---|---|---|---|
| 364,567 | 6/1887 | Baron | 206/541 |
| 2,097,186 | 10/1937 | Hinnenkamp | 206/541 |
| 3,384,259 | 5/1968 | Hoffstadt | 206/550 X |
| 3,567,105 | 3/1971 | McFarlin | 229/15 |
| 3,613,872 | 10/1971 | Donnelly | 206/4 |
| 4,050,581 | 9/1977 | Sedlacek | 206/544 |
| 4,078,701 | 3/1978 | Clubb | 206/546 X |
| 5,065,867 | 11/1991 | Alfredson | 206/542 |
| 5,086,926 | 2/1992 | Paige et al. | 206/546 |
| 5,181,612 | 1/1993 | Liu | 206/546 |
| 5,188,234 | 2/1993 | Fukuda et al. | 206/546 X |

FOREIGN PATENT DOCUMENTS 2491876  4/1982  France ............... 206/546

*Primary Examiner*—William I. Price
*Attorney, Agent, or Firm*—Rhodes & Ascolillo

[57] ABSTRACT

A separable food and beverage combination has an upper chamber and a lower chamber. The upper chamber is formed by a first circumferential wall and a first bottom wall attached to the first circumferential wall. A first lid is releasably connected to the first circumferential wall and opposes the first bottom wall. The first lid has a hinged spout hingingly movable from a closed position and an open position. The lower chamber is formed by a second circumferential wall and a second bottom wall attached to the second circumferential wall. A lid plate, threadingly connected to the first bottom wall and threadingly connected to the second circumferential wall, opposes the second bottom wall. A bowl is removably placed within the lower chamber. A removable partition forms separable compartments in the bowl. A pair of first and a pair of second handle locking recesses in the first and second circumferential walls, respectively, have a first handle locking groove in a perimeter of each of the first handle locking recesses and second handle locking groove in a perimeter of each of the second handle locking recesses respectively. A removable handle has a pair of locking arms and a locking ring on each of the locking arms. Each of the locking arms and the locking ring thereon are releasably locked into one of the first handle locking recesses or into one of the second handle locking recesses. A second lid is releasably connected to the second circumferential wall only when the lower chamber is used.

18 Claims, 5 Drawing Sheets

SEPARABLE FOOD AND BEVERAGE CONTAINER COMBINATION

BACKGROUND OF THE INVENTION

1. Field of the Invention

This invention relates, in general, to an insulated food and beverage container and, in particular, to a food container and a beverage container that can be fastened together and used as a set or carried separately as individual pieces.

2. Description of the Related Art

Lunch buckets and thermos bottles have accompanied people carrying their lunch to remote location for ages. Difficulties arise in attempting to transport certain hot foods and in keeping a beverage from ruining certain bulk foods if the container storing the beverage leaks and is in close proximity to the other food.

U.S. Pat. No. 3,567,105 to B. E. McFarlin on Mar. 02, 1971 for a Combined Food and Drink Container describes a box with flexible walls and a closable top. The box has a flexible fluid-impervious collapsible pouch attached within. The box will hold a bulk consumable like popcorn and the pouch will hold a beverage to consume with the bulk item.

U.S. Pat. No. 3,613,872 to J. G. Donnelly on Oct. 19, 1971 for a Receptacle Device for Food and Beverage Products or the like shows a lunchbox having a heat-insulating housing with a first container to store hot fluids and a second container suspended above the first to store food. There is an open space above the second container to store utensils.

U.S. Pat. No. 4,050,581 to R. Sedlacek on Sep. 27, 1977 for a Lunch Bucket and Beverage Bottle Combination describes a lunch bucket having a separate compartment for storing a beverage bottle. The door to the bottle compartment provides a friction lock to hold the bottle in place.

U.S. Pat. No. 5,065,867 to H. M. Alfredson on Nov. 19, 1991 for a Hot and Cold Lunch Box for Automobile Travel shows a lunch box that has two compartments. Both compartments are insulated to enable them to maintain their contents at either a hot or cold temperature. The upper section of the lunch box can also be placed over the door handle and lock of an automobile to protect them from ice.

U.S. Pat. No. 5,181,612 to Y. W. Liu on Jan. 26, 1993 for a Compact Collapsible Lunch Box describes a lunch box with a lower section that has collapsible walls. There is beverage container and a thermal gel pack to cool the food and the beverage container.

The above patents attempt to solve these storage and transportation problems but do not offer the convenience and complete separability of the present invention.

SUMMARY OF THE INVENTION

The present invention provides an upper container for hot or cold beverages. The lower container is used for hot or cold bulk food. The containers are preferably cylindrical in shape and may be joined together by threaded connectors when both are to be used or unthreaded from each other when only one container is to be used. It is preferably made (by known methods such as molding),of break-resistant plastic and has insulated walls. The insulation is that commonly used for such devices. The upper container (chamber) has a lid with a spout to allow the beverage to be easily dispensed. The lower container (chamber) may be used with a removable bowl having a removable partition to segregate different food stuffs. The partition may be removed if desired. The bowl has a lid to seal the food stuffs therein. The lower container is further sealed by a plate which also acts as a lid for the lower chamber when the two containers are fastened together. A knife, fork and spoon may be stored on the plate for the convenience of the user. If only the lower container is to be used, a second lid is utilized and is screwed into the plate to allow the plate and the lower container to be sealed and transported. A removable handle is supplied and can be attached to the upper container if both containers are attached to each other or if only the upper container is to be used. The handle may be removed from the upper container and inserted into the recesses of the lower container when only the lower container is to be used. An O-ring is placed on an arm of the handle and when the arm is pressed into the locking recess, the O-ring snaps into the locking groove. Pulling outward on the handle arm snaps the arm and the O-ring out of the recess.

In one embodiment of the present invention, a separable food and beverage combination is described that has an upper chamber and a lower chamber. The upper chamber is formed by a first circumferential wall and a first bottom wall attached to the first circumferential wall. A first lid is releasably connected to the first circumferential wall and opposes the first bottom wall. There is a lower chamber formed by a second circumferential wall and a second bottom wall attached to the second circumferential wall. A lid plate (a plate that acts as both a lid and a plate) is releasably connected to the first bottom wall and is releasably connected to the second circumferential wall and the lid plate opposes the second bottom wall. A bowl is removably placed within the lower chamber to hold food. A sealing lid is removably attached to the bowl. There is a first handle locking recess in the first circumferential wall. There is a second handle locking recess in the second circumferential wall.

The first handle locking recess may have a first handle locking groove in a perimeter of the first handle locking recess. The second handle locking recess may have a second handle locking groove in a perimeter of the second handle locking recess. There may be removable handle. The removable handle may have a locking arm and a locking ring on the locking arm. The locking arm and the locking ring may be releasably locked into either the first handle locking recess or into the second handle locking recess. The first lid may have a hinged spout hingingly movable from a closed position and an open position hingedly attached to a first lid base of the first lid.

There may be a second lid, releasably connected to the second circumferential wall, that opposes the second bottom wall and is removably connected to the second circumferential wall when only the lower chamber is used. The second lid may have a lid base and a gripping handle attached to an upper surface of the lid base.

The lid plate may have a plate base and an upper surface on the plate base. A plate circumferential wall is attached to a perimeter of the plate base. There may be an inner threaded connector on an inner surface of the plate circumferential wall that may be threadingly connected to the first circumferential wall. An outer threaded connector, on an outer surface of the plate circumferential wall, may be threadingly connected to the second circumferential wall. There may be a plate partition on the upper surface of the plate base. The bowl may have a removable partition in the bowl forming separable compartments in the bowl.

It is an object of this invention to provide a device for the storage and transportation of food and beverages that has two containers that can be fastened together or utilized singularly.

It is another object of this invention to provide a device for the storage and transportation of food and beverages that supplies a plate and eating utensils.

DESCRIPTION OF THE PREFERRED EMBODIMENTS

Figure 1:
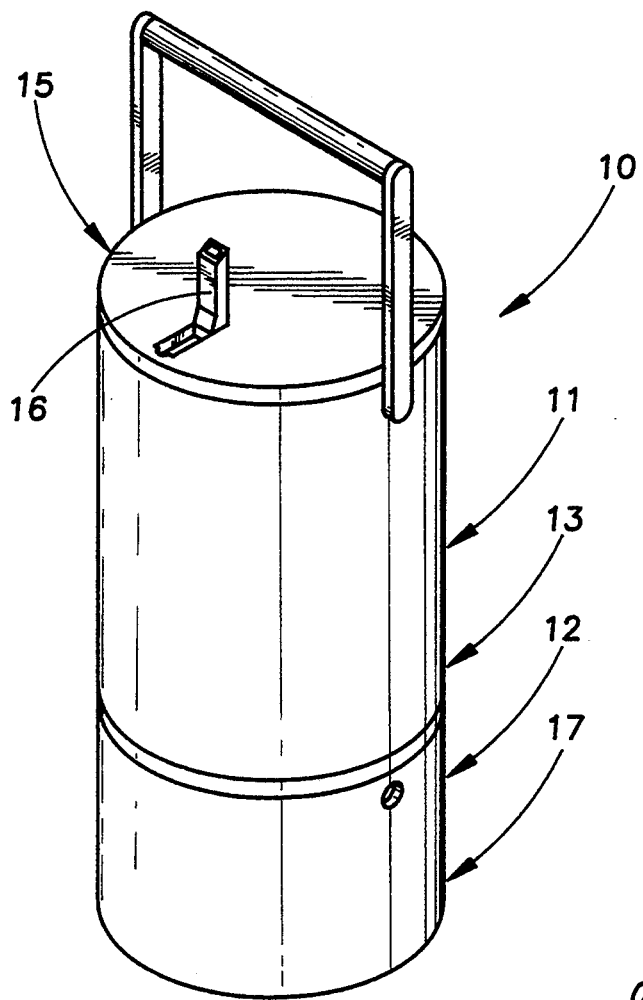
FIG. 1 is a perspective view of the Separable Food and Beverage Container Combination showing the upper chamber and the lower chamber releasably attached to each other and showing the spout in the open position and showing the detachable handle releasably attached to the first circumferential wall of the upper chamber.
Figure 2:
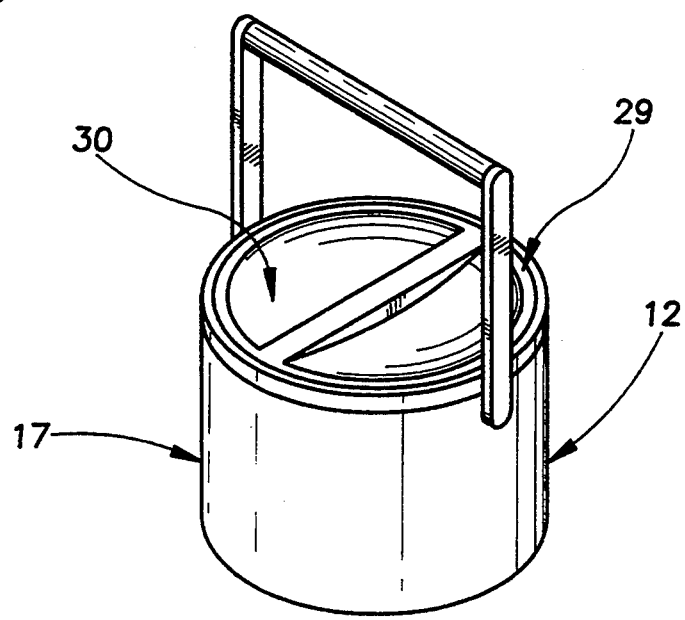
FIG. 2 is a perspective view of the lower chamber showing the removable handle releasably attached to the second circumferential wall of the lower chamber.

Referring to FIGS. 1 through 5, a separable food and beverage combination 10 is shown and described that has an upper chamber 11 and a lower chamber 12. The upper chamber 11 is formed by a first circumferential wall (tubular) 13 and a first bottom wall 14 attached to the first circumferential wall 13. There is a first lid 15, releasably connected to the first circumferential wall 13, that opposes the first bottom wall 14. The first lid 15 has a hinged spout 16 hingingly movable from a closed position (shown in FIG. 3) and an open position (shown in FIG. 1). The spout 16 is hingedly connected to a first lid base of the first lid 15. The lower chamber 12 is formed by a second circumferential wall (tubular) 17 and a second bottom wall 18 attached to the second circumferential wall 17. A lid plate 19, releasably connected (by threads) to the first bottom wall 14 and releasably connected (by threads) to the second circumferential wall 17, opposes the second bottom wall 18.

A bowl 20 is removably placed within the lower chamber 12 and there is a removable partition 21 in the bowl 20 that forms separable compartments in the bowl 20. There is a sealing lid 22 removably attached (usually by press-fit into a recessed lip on the inner perimeter of the bowl 20.

Figure 3A:
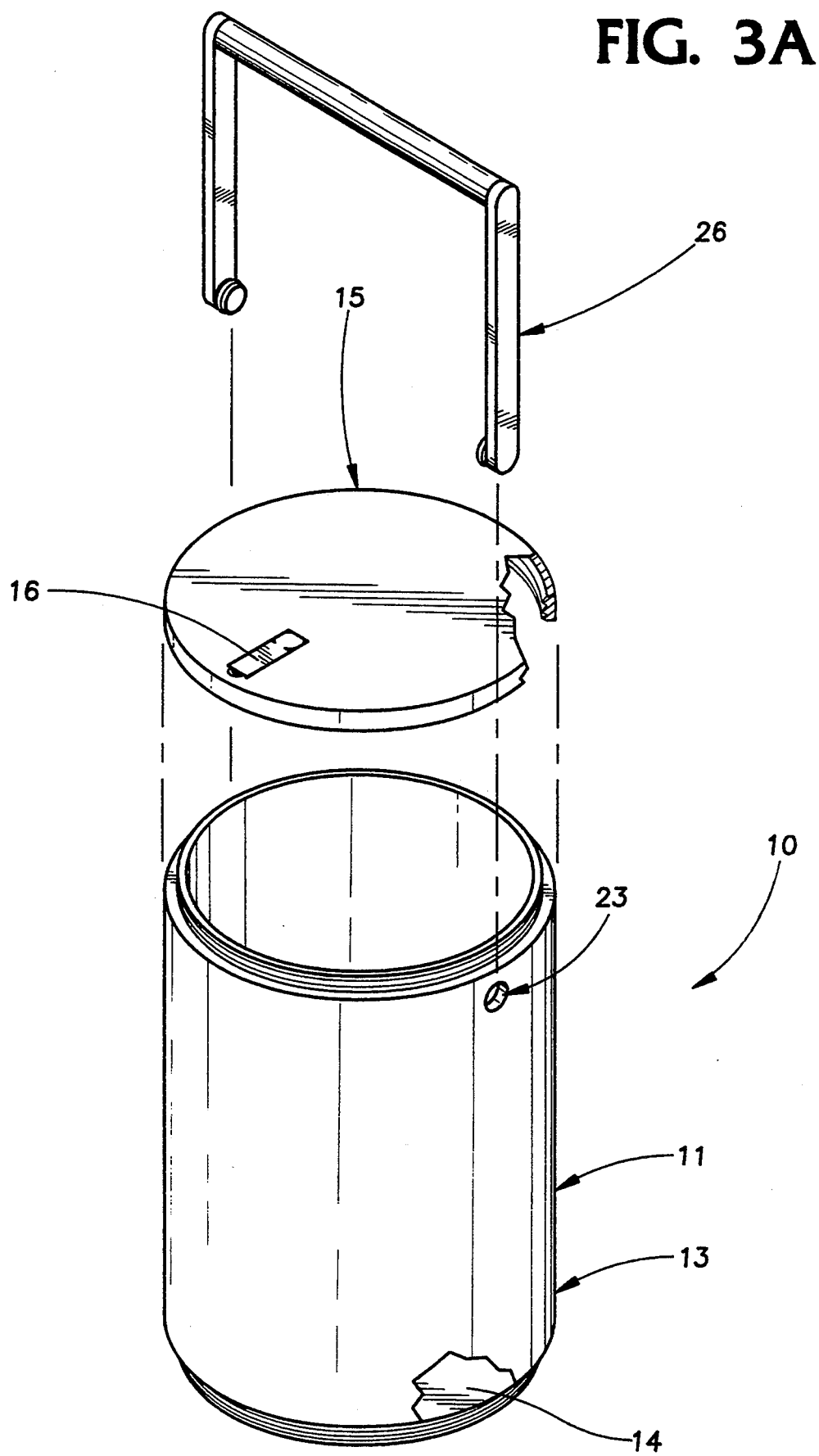
FIGS. 3A and 3B show an exploded perspective view of the Separable Food and Beverage Container Combination with a cut-away section of the first lid to show the threads therein. There is also a cut-away view of the bottom of the upper chamber circumferential wall and a cut-away view of the bottom of the lower chamber circumferential wall to show the first and second bottom wall respectively.
Figure 3B:
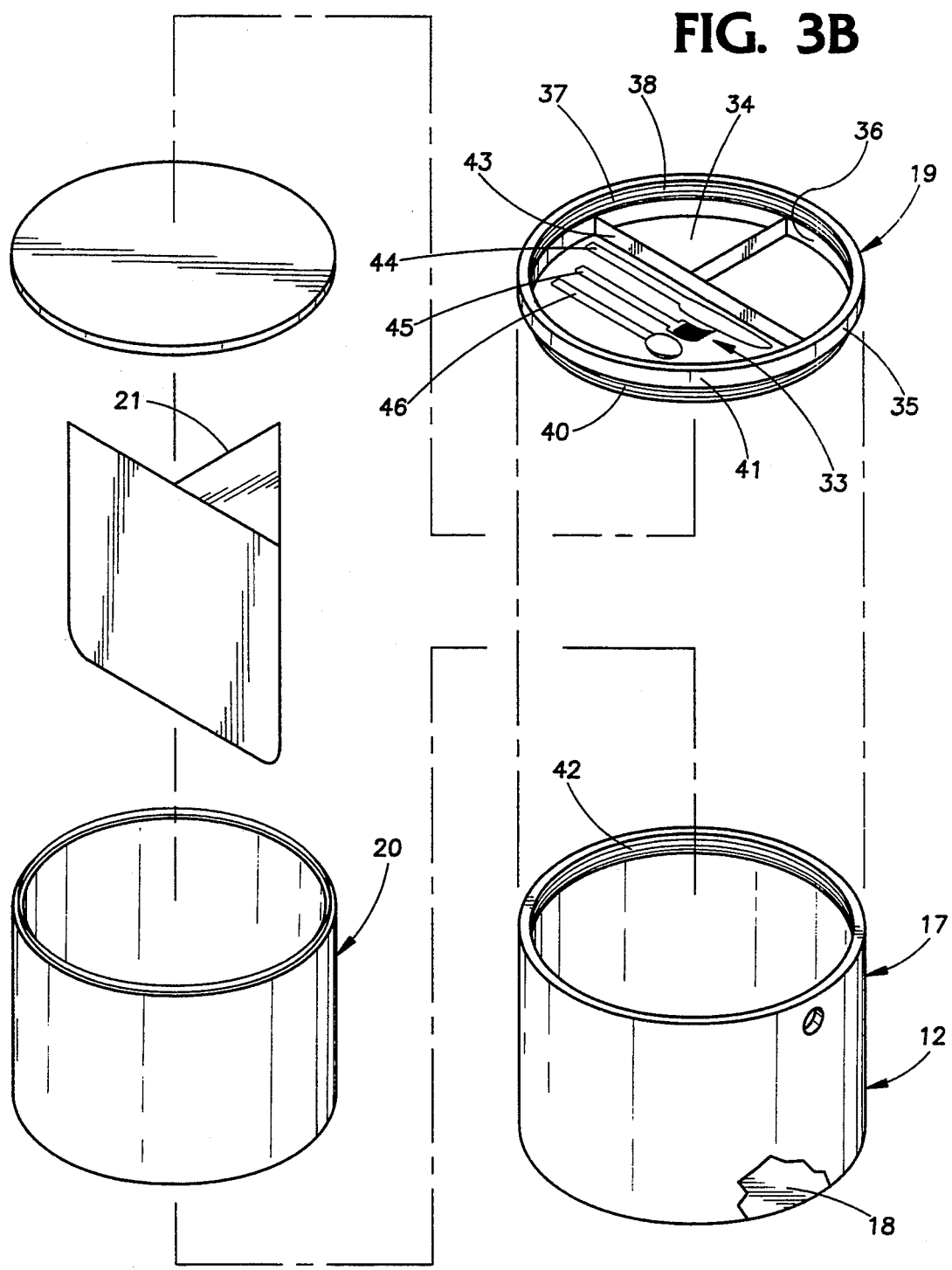
Figure 4:
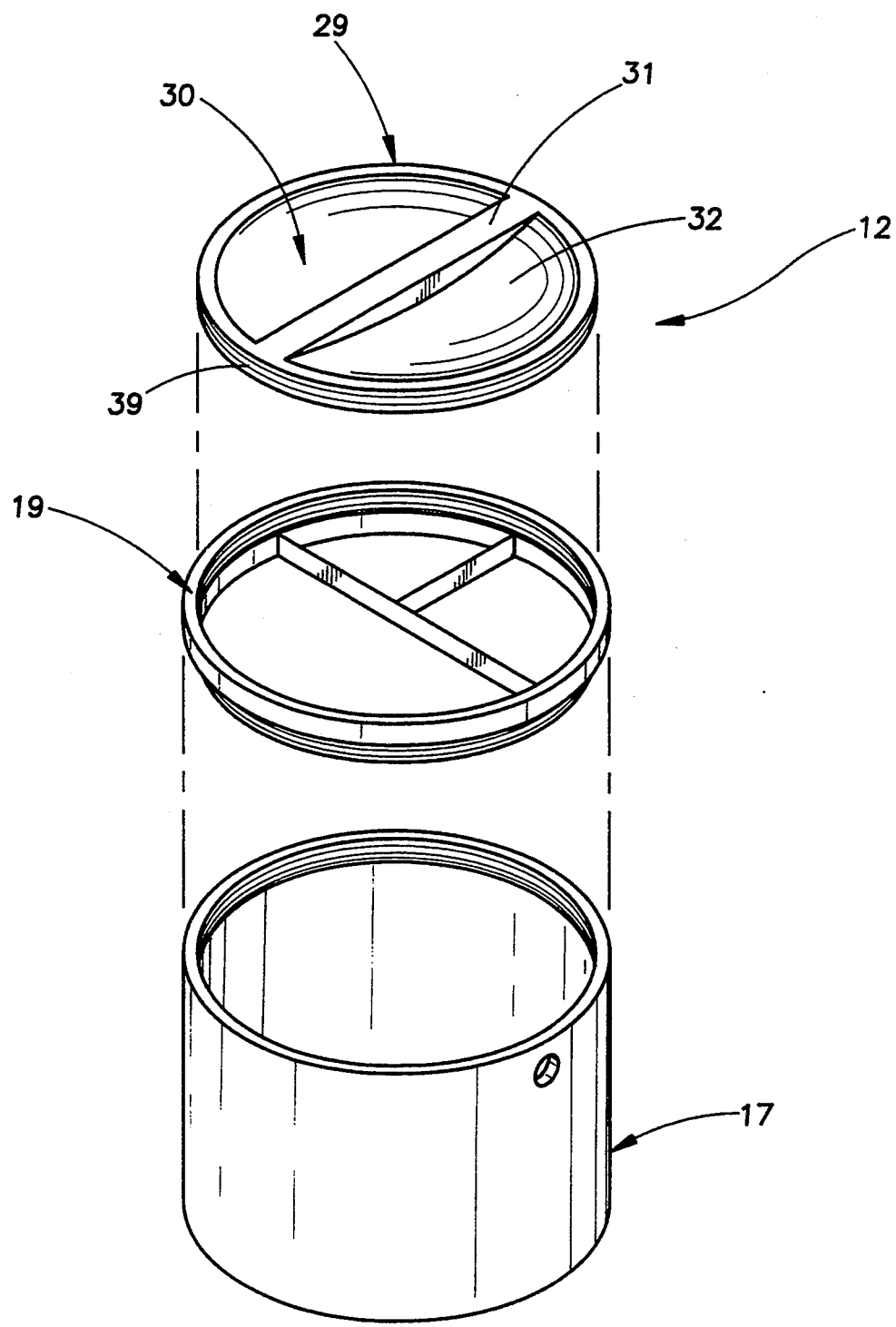
FIG. 4 is an exploded perspective view of the lower chamber showing the second lid being used with the lid plate.
Figure 5:
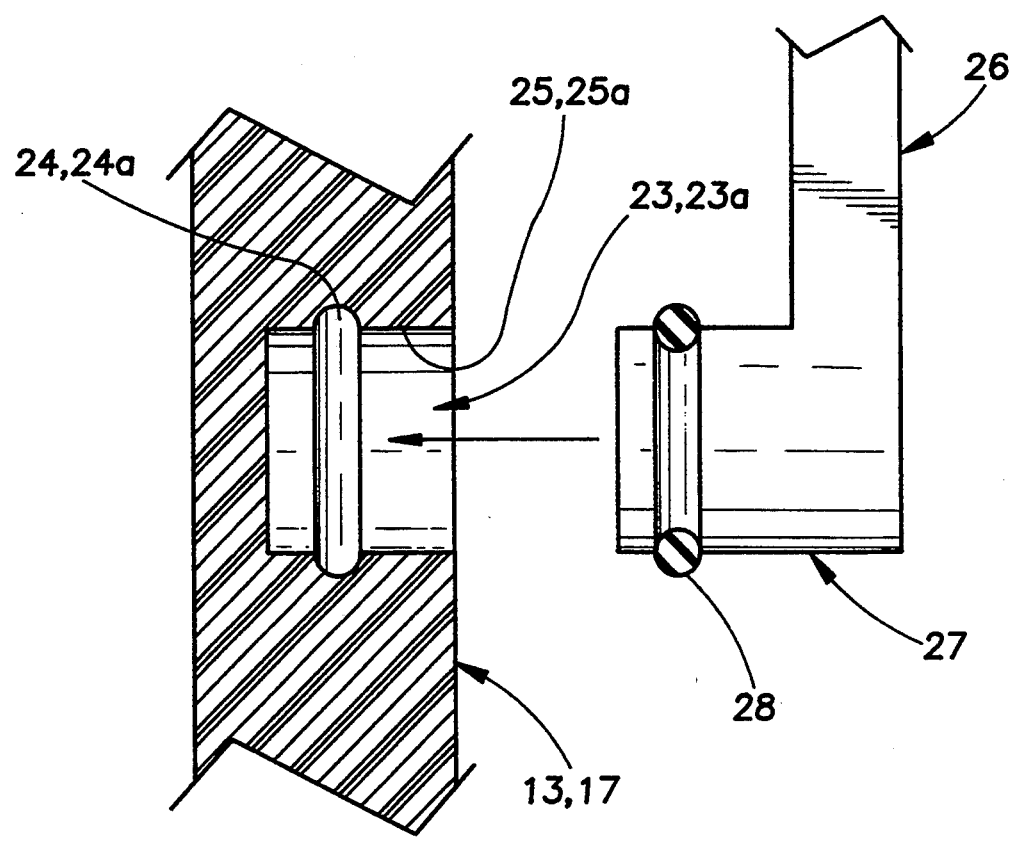
FIG. 5 is a partial cross-section of the circumferential wall of the upper or lower container and a partial view of the handle showing the handle locking arm and locking ring prior to being inserted into handle locking recess and locking groove.

A pair of first handle locking recesses 23 (only one of the first and second pairs are shown but the ones not shown is a mirror image of the ones shown) in the first circumferential wall 13 has a first handle locking groove 24 in a perimeter 25 of each of the first handle locking recesses 23 (see FIG. 3 and 5). There are a pair of second handle locking recesses 23a in the second circumferential wall 17 that have a second handle locking groove 24a in a perimeter 25a of each of the second handle locking recesses 23a (See FIGS. 1 and 5. The reference numbers for all of the locking recesses will be placed in FIG. 5 since the appearance is the same). These second handle locking recesses 23a look just like the first handle locking recesses 23 as shown in FIG. 5. The removable handle 26 has a pair of locking arms 27 and a locking ring 28 such as an O-ring on each of the locking arms 27. Each of the locking arms 27 and the locking ring 28 thereon releasably lock into one of the first handle locking recesses 23 or one of the second handle locking recesses 23a.

A second lid 29 releasably connected to the second circumferential wall 17, opposes the second bottom wall 18 and is removably connected to the second circumferential wall 17 when only the lower chamber 12 is used. The second lid 29 has a lid base 30 and a gripping handle 31 attached to an upper surface 32 of the lid base 31.

The lid plate 19 has a plate base 33 and an upper surface 34 on the plate base 33. There is a plate circumferential wall 35 attached to a perimeter 36 of the plate base. There is an inner threaded connector 37 on an inner surface 38 of the plate circumferential wall 35 that may be threadingly connected to the first circumferential wall 13 when the two chambers 11 and 12 are to be used together or used to threadingly receive the threads 39 of the second lid 29 when the lower chamber 12 is being used by itself. There is an outer threaded connector 40 on an outer surface 41 of the plate circumferential wall 35 that may be threadingly connected (via threads 42) to the second circumferential wall 17. There is a plate partition 43 on the upper surface 34 of the plate base 33 to strengthen the lid plate 19 when it is being used as a lid and to separate portions of food on the lid plate when it is being used as a plate. Eating utensils such as a knife 44, fork 45 and spoon 46 (See FIG. 3) may be placed on the upper surface 34 of the plate base 33 and incorporated as part of the combination 10.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A separable food and beverage combination comprising:
    (a) an upper chamber formed by a first circumferential wall and a first bottom wall attached to the first circumferential wall;
    (b) a first lid, releasably connected to the first circumferential wall, opposing the first bottom wall;
    (c) a lower chamber formed by a second circumferential wall and a second bottom wall attached to the second circumferential wall;
    (d) a lid plate, releasably connected to the first bottom wall and releasably connected to the second circumferential wall, opposing the second bottom wall;

(e) a bowl removably placed within the lower chamber;
(f) a sealing lid removably attached to the bowl;
(g) a first handle locking recess in the first circumferential wall; and
(h) a second handle locking recess in the second circumferential wall.

2. A separable food and beverage combination as described in claim 1 wherein the first handle locking recess comprises a first handle locking groove in a perimeter of the first handle locking recess.

3. A separable food and beverage combination as described in claim 1 wherein the second handle locking recess comprises a second handle locking groove in a perimeter of the second handle locking recess.

4. A separable food and beverage combination as described in claim 1 further comprising a removable handle, the removable handle further comprising:
(a) a locking arm; and
(b) a locking ring on the locking arm.

5. A separable food and beverage combination as described in claim 4 comprising the locking arm and the locking ring releasably locked into the first handle locking recess.

6. A separable food and beverage combination as described in claim 4 wherein the locking arm and the locking ring are releasably locked into the second handle locking recess.

7. A separable food and beverage combination as described in claim 1 wherein the first lid further comprises a hinged spout hingedly connected to a base of the first lid and hingingly movable from a closed position and an open position.

8. A separable food and beverage combination as described in claim 1 further comprising a second lid releasably connected to the second circumferential wall, opposing the second bottom wall and removably connected to the second circumferential wall when only the lower chamber is used.

9. A separable food and beverage combination as described in claim 8 wherein second lid comprises:
(a) a lid base; and
(b) a gripping handle attached to an upper surface of the lid base.

10. A separable food and beverage combination as described in claim 1 wherein the lid plate further comprises:
(a) a plate base;
(b) an upper surface on the plate base;
(c) a plate circumferential wall attached to a perimeter of the plate base;
(d) an inner threaded connector on an inner surface of the plate circumferential wall threadingly connected to the first circumferential wall;
(e) an outer threaded connector on an outer surface of the plate circumferential wall threadingly connected to the second circumferential wall; and
(f) a plate partition on the upper surface of the plate base.

11. A separable food and beverage combination as described in claim 8 wherein second lid comprises:
(a) a lid base; and
(b) a gripping handle attached to an upper surface of the lid base.

12. A separable food and beverage combination as described in claim 1 wherein the bowl further comprises a removable partition in the bowl forming separable compartments in the bowl.

13. A separable food and beverage combination comprising:
(a) an upper chamber formed by a first circumferential wall and a first bottom wall attached to the first circumferential wall;
(b) a first lid, releasably connected to the first circumferential wall, opposing the first bottom wall;
(c) a lower chamber formed by a second circumferential wall and a second bottom wall attached to the second circumferential wall;
(d) a lid plate, releasably connected to the first bottom wall and releasably connected to the second circumferential wall, opposing the second bottom wall;
(e) a bowl removably placed within the lower chamber;
(f) a removable partition in the bowl forming separable compartments in the bowl;
(g) a sealing lid removably attached to the bowl;
(h) a pair of first handle locking recesses in the first circumferential wall comprising a first handle locking groove in a perimeter of each of the first handle locking recesses;
(i) a pair of second handle locking recesses in the second circumferential wall comprising a second handle locking groove in a perimeter of each of the second handle locking recesses;
(j) a removable handle comprising:
a pair of locking arms; and
a locking ring on each of the locking arms; and
(k) each of the locking arms and the locking ring thereon releasably locked into one of the first handle locking recesses.

14. A separable food and beverage combination as described in claim 13 comprising each of the locking arms and the locking ring thereon releasably locked into one of the second handle locking recesses.

15. A separable food and beverage combination as described in claim 13 wherein the first lid further comprises a hinged spout hingedly connected to a base of the first lid and hingingly movable from a closed position and an open position.

16. A separable food and beverage combination as described in claim 13 further comprising a second lid releasably connected to the second circumferential wall, opposing the second bottom wall and removably connected to the second circumferential wall when only the lower chamber is used.

17. A separable food and beverage combination as described in claim 16 wherein the second lid further comprises:
(a) a lid base; and
(b) a gripping handle attached to an upper surface of the lid base.

18. A separable food and beverage combination as described in claim 13 wherein the lid plate further comprises:
(a) a plate base;
(b) an upper surface on the plate base;
(c) a plate circumferential wall attached to a perimeter of the plate base;
(d) an inner threaded connector on an inner surface of the plate circumferential wall threadingly connected to the first circumferential wall;
(e) an outer threaded connector on an outer surface of the plate circumferential wall threadingly connected to the second circumferential wall; and
(f) a plate partition on the upper surface of the plate base.

* * * * *